US011512970B2

(12) United States Patent
Li et al.

(10) Patent No.: US 11,512,970 B2
(45) Date of Patent: Nov. 29, 2022

(54) METHOD AND APPARATUS FOR GENERATING INFORMATION

(71) Applicant: Baidu Online Network Technology (Beijing) Co., Ltd, Beijing (CN)

(72) Inventors: Yanyan Li, Beijing (CN); Jingbo Zhou, Beijing (CN); Jianguo Duan, Beijing (CN); Hui Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 189 days.

(21) Appl. No.: 16/568,927

(22) Filed: Sep. 12, 2019

(65) Prior Publication Data

US 2020/0141753 A1    May 7, 2020

(30) Foreign Application Priority Data

Nov. 2, 2018    (CN) .......................... 201811302018.1

(51) Int. Cl.
*G01C 21/36* (2006.01)
*G06K 9/62* (2022.01)
*G01C 21/34* (2006.01)

(52) U.S. Cl.
CPC ..... *G01C 21/3617* (2013.01); *G01C 21/3476* (2013.01); *G01C 21/3484* (2013.01); *G01C 21/3614* (2013.01); *G06K 9/6256* (2013.01)

(58) Field of Classification Search
CPC ............ G01C 21/3617; G01C 21/3476; G01C 21/3484; G01C 21/3614; G06K 9/6256
See application file for complete search history.

(56) References Cited

U.S. PATENT DOCUMENTS

| 7,197,500 B1* | 3/2007 | Israni ..................... G01C 21/32 |
| | | 340/995.14 |
| 2010/0198814 A1* | 8/2010 | Petersen ............... H04W 4/029 |
| | | 707/722 |

(Continued)

FOREIGN PATENT DOCUMENTS

| CN | 107105055 A | 8/2017 | |
| WO | WO-2019075120 A1 * | 4/2019 | .............. H04W 4/23 |

OTHER PUBLICATIONS

Zhou Liang, Urban Area Division Method Based on Vehicle GPS Data, B.E. (Nanchang Hangkong University) 2014, A thesis submitted for the degree of Master of Engineering in Software Engineering in the Graduate School of Hunan University, May 2017, 72 pages.

*Primary Examiner* — Rachid Bendidi
*Assistant Examiner* — Sahar Motazedi
(74) *Attorney, Agent, or Firm* — Kilpatrick Townsend & Stockton LLP

(57) ABSTRACT

Embodiments of the present disclosure provide a method and apparatus for generating information. A method may include: determining, according to received positioning request information, visiting information for a target area of interest, the visiting information including location information of at least one visiting point; determining, according to the location information of the at least one visiting point, a visiting point distribution map including the at least one visiting point; performing grid division on the visiting point distribution map, to obtain a first grid map including at least one grid; and generating, based on the first grid map, outline information for the target area of interest.

14 Claims, 7 Drawing Sheets

(56) References Cited

U.S. PATENT DOCUMENTS

| | | | |
|---|---|---|---|
| 2014/0337409 A1* | 11/2014 | Kim | H04L 67/2823 |
| | | | 709/203 |
| 2015/0133167 A1* | 5/2015 | Edge | G01S 5/02 |
| | | | 455/456.3 |
| 2020/0134827 A1* | 4/2020 | Saha | G06K 9/628 |
| 2020/0304954 A1* | 9/2020 | Ni | G01S 5/02524 |

* cited by examiner

METHOD AND APPARATUS FOR GENERATING INFORMATION

CROSS-REFERENCE TO RELATED APPLICATIONS

This application claims priority to Chinese Patent Application No. 201811302018.1, filed on Nov. 2, 2018, titled "Method and apparatus for generating information," which is hereby incorporated by reference in its entirety.

TECHNICAL FIELD

Embodiments of the present disclosure relate to the field of computer technology, and specifically to a method and apparatus for generating information.

BACKGROUND

In an geographic application, an AOI (area of interest, i.e., area of information) refers to a regional geographical entity in map data. From the perspective of space, the geographical entity such as an office building, a tourist spot and a shopping mall is a three-dimensional space building, and area data for describing the two-dimensional space of the geographical entity may vividly describe spatial attribute of the geographical entity. The outline of the AOI refers to boundary information of the regional geographical entity, and the determination of the outline of the AOI is to determine the specific region corresponding to the AOI on the map. At present, the determination of the outline of the AOI in the map data is mainly through a manual collection. For the manual collection, it is necessary to configure a professional collection device and employ a professional collector, to perform strict functional processes, and thus, the outline of the AOI is finally determined.

SUMMARY

Embodiments of the present disclosure propose a method and apparatus for generating information.

In a first aspect, an embodiment of the present disclosure provides a method for generating information. The method includes: determining, according to received positioning request information, visiting information for a target area of interest, the visiting information including location information of at least one visiting point; determining, according to the location information of the at least one visiting point, a visiting point distribution map including the at least one visiting point; performing grid division on the visiting point distribution map, to obtain a first grid map including at least one grid; and generating, based on the first grid map, outline information for the target area of interest.

In some embodiments, the generating, based on the first grid map, outline information for the target area of interest includes: performing a filtering processing on the at least one grid in the first grid map to obtain a second grid map; and determining, from the second grid map, a grid as a boundary grid, and generating, according to location information of the boundary grid, the outline information for the target area of interest.

In some embodiments, the second grid map includes road location information. The determining, from the second grid map, a grid as a boundary grid includes: determining, from the second grid map, the grid as the boundary grid, according to the road location information and location information of the grid in the second grid map.

In some embodiments, the performing a filtering processing on the grid in the first grid map to obtain a second grid map includes: performing, for each of the at least one grid in the first grid map, the following filtering processing: determining whether a number of visiting points included in the grid is less than a preset number threshold, and deleting the grid in response to determining the number of the visiting points included in the grid being less than the number threshold; and using, in response to determining a completion of the filtering processing performed on the each grid in the first grid map, the processed first grid map as the second grid map.

In some embodiments, the generating, based on the first grid map, outline information for the target area of interest includes: inputting the first grid map into a pre-established generation model, to obtain boundary pixel point information, the generation model being used to represent a corresponding relationship between a grid map and boundary pixel point information; and generating, according to the obtained boundary pixel point information, the outline information for the target area of interest.

In some embodiments, the generation model is trained and obtained by: acquiring a set of training samples, a training sample including the grid map and the boundary pixel point information corresponding to the grid map; and using the grid map of the training sample in the set of training samples as an input, and using the boundary pixel point information corresponding to the inputted grid map as an expected output, to train and obtain the generation model.

In a second aspect, an embodiment of the present disclosure provides an apparatus for generating information. The apparatus includes: a first determining unit, configured to determine, according to received positioning request information, visiting information for a target area of interest, the visiting information including location information of at least one visiting point; a second determining unit, configured to determine, according to the location information of the at least one visiting point, a visiting point distribution map including the at least one visiting point; a dividing unit, configured to perform grid division on the visiting point distribution map, to obtain a first grid map including at least one grid; and a generating unit, configured to generate, based on the first grid map, outline information for the target area of interest.

In some embodiments, the generating unit includes: a filtering unit, configured to perform a filtering processing on the grid in the first grid map to obtain a second grid map; and a generating subunit, configured to determine, from the second grid map, a grid as a boundary grid, and generate, according to location information of the boundary grid, the outline information for the target area of interest.

In some embodiments, the second grid map includes road location information. The generating subunit is further configured to: determine, from the second grid map, the grid as the boundary grid, according to the road location information and location information of the grid in the second grid map.

In some embodiments, the filtering unit is further configured to: perform, for each of the at least one grid in the first grid map, the following filtering processing: determining whether a number of visiting points included in the grid is less than a preset number threshold, and deleting the grid in response to determining the number of the visiting points included in the grid being less than the number threshold; and use, in response to determining a completion of the filtering processing performed on the each grid in the first grid map, the processed first grid map as the second grid map.

In some embodiments, the generating unit is further configured to: input the first grid map into a pre-established generation model, to obtain boundary pixel point information, the generation model being used to represent a corresponding relationship between a grid map and boundary pixel point information; and generate, according to the obtained boundary pixel point information, the outline information for the target area of interest.

In some embodiments, the generation model is trained and obtained by: acquiring a set of training samples, a training sample including the grid map and the boundary pixel point information corresponding to the grid map; and using the grid map of the training sample in the set of training samples as an input, and using the boundary pixel point information corresponding to the inputted grid map as an expected output, to train and obtain the generation model.

In a third aspect, an embodiment of the present disclosure provides a server. The server includes: one or more processors; and a storage apparatus, configured to store one or more programs. The one or more programs, when executed by the one or more processors, cause the one or more processors to implement the method described in any implementation in the first aspect.

In a fourth aspect, an embodiment of the present disclosure provides a computer readable medium storing a computer program. The computer program, when executed by a processor, implements the method described in any implementation in the first aspect.

According to the method and apparatus for generating information provided by the embodiments of the present disclosure, the visiting information for the target area of interest is first determined according to the received positioning request information. Then, the visiting point distribution map including the at least one visiting point is determined according to the location information of the at least one visiting point. Next, the grid division is performed on the visiting point distribution map, to obtain the first grid map including the at least one grid. Finally, the outline information for the target area of interest is generated based on the first grid map. Accordingly, the positioning request information is effectively used, and the automatic generation of the outline information of the target area of interest is implemented, thus saving generation costs of the outline information of the area of interest, and improving the generation efficiency of the outline information of the area of interest.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail by combining the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
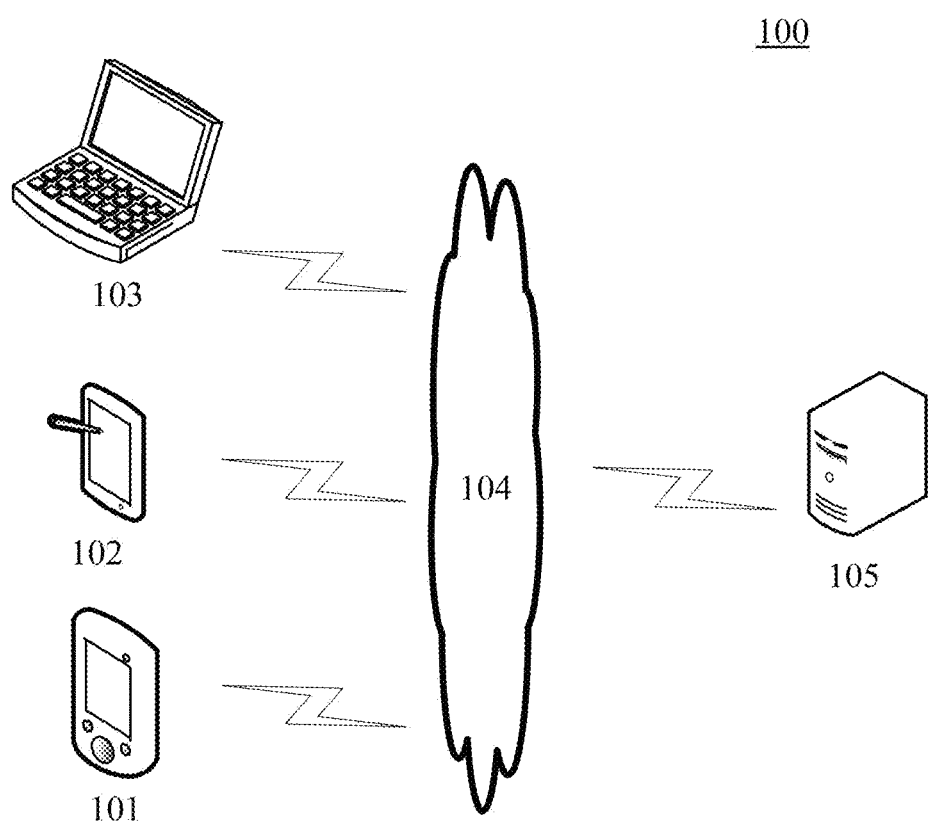
FIG. 1 is a diagram of an exemplary system architecture in which embodiments of the present disclosure may be applied.

FIG. 1 shows an exemplary system architecture 100 in which a method for generating information or an apparatus for generating information according to embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send messages. Various communication client applications (e.g., a map application, a position system, a shopping application, a search application and social platform software) may be installed on the terminal devices 101, 102 and 103.

The terminal devices 101, 102 and 103 may be hardware or software. When the terminal devices 101, 102 and 103 are hardware, the terminal devices 101, 102 and 103 may be various electronic devices capable of sending positioning request information, the electronic devices including, but not limited to, a smart phone, a tablet computer, a smart watch and a smart bracelet. When the terminal devices 101, 102 and 103 are software, the terminal devices 101, 102 and 103 may be installed in the above-listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various kinds of services, for example, a backend server processing the positioning request information sent by the terminal devices 101, 102 and 103. The backend server may process (e.g., analyze) data such as the received positioning request information, and generate outline information of an area of interest.

It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of pieces of software or a plurality of software modules (e.g., software or software modules for providing a distributed service), or as a single piece of software or a single software module, which will not be specifically defined here.

It should be noted that the method for generating information provided by the embodiments of the present disclosure is generally performed by the server 105. Correspondingly, the apparatus for generating information is generally provided in the server 105.

It should be appreciated that the numbers of the terminal devices, the networks, and the servers in FIG. 1 are merely illustrative. Any number of terminal devices, networks and servers may be provided based on actual requirements.

Figure 2:
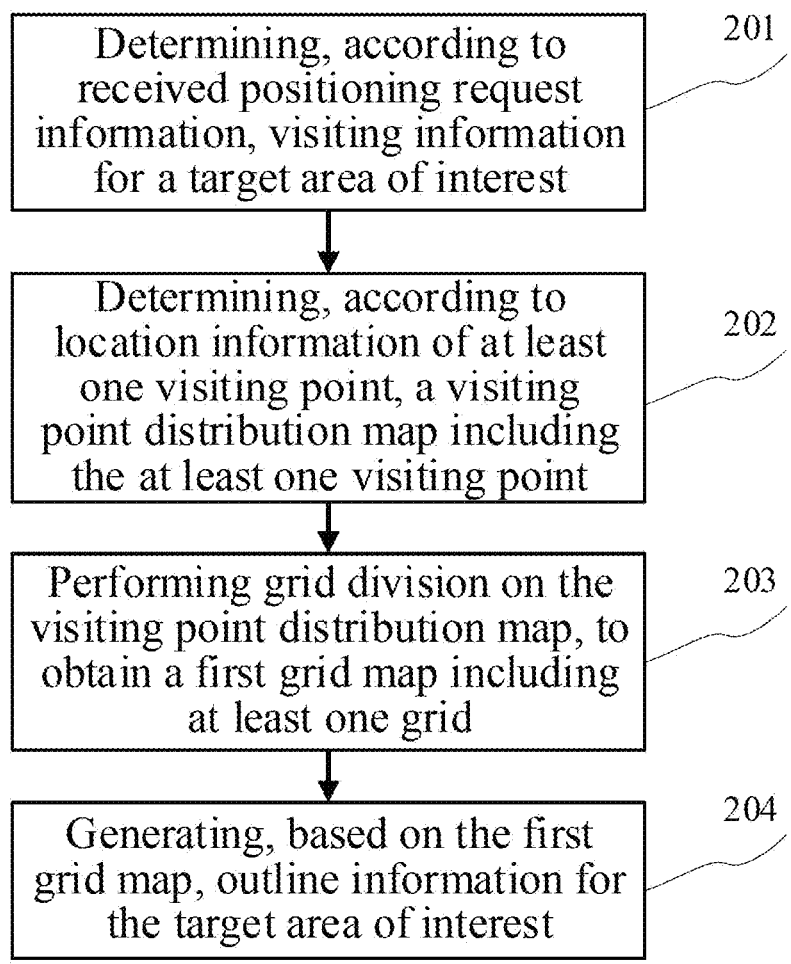
FIG. 2 is a flowchart of a method for generating information according to an embodiment of the present disclosure.

Further referring to FIG. 2, FIG. 2 illustrates a flow 200 of an embodiment of a method for generating information according to the present disclosure. The method for generating information includes the following steps.

Step 201, determining, according to received positioning request information, visiting information for a target area of interest.

In this embodiment, an executing body (e.g., the server 105 shown in FIG. 1) of the method for generating information may receive, from a terminal device (e.g., the terminal devices 101, 102 and 103 shown in FIG. 1) used by a user, the positioning request information by means of a wireless connection. Here, the positioning request information may include information for positioning the terminal device. As an example, the positioning request information may include an AP (wireless access point) signal strength sequence received by the terminal device, information of the WiFi (wireless-fidelity) scanned by the terminal device, information of the WiFi with which the terminal device is connected, etc. The executing body may generate positioning data according to the positioning request information. The positioning data may include positioning time, location information of the terminal device (e.g., latitude and longitude coordinates), etc. Then, the executing body may determine the visiting information for the target area of interest according to the positioning data of the terminal device, and the visiting information may include the location information of at least one visiting point. It should be noted that generating the positioning data according to the positioning request information is a well-known technology widely studied and applied at present, which will not be repeatedly described here.

Here, information of the visiting point may include the visiting time, location information, an identifier of the area of interest, and the like. The identifier of the area of interest may be used to uniquely identify an area of interest. As an example, the executing body may determine the information for the visiting point of the target area of interest in the following way:

First, the executing body may receive positioning request information sent by massive terminal devices so as to generate massive positioning data, and determine a plurality of pieces of target positioning data from the massive positioning data. The geographic location indicated by the location information of the target positioning data is in a predetermined geographic region. The predetermined geographic region includes the target area of interest, and may further include other areas of interest other than the target area of interest. That is, the executing body selects, from the massive positioning data, the positioning data falling into the geographic region (the geographic region is larger than the region occupied by the target area of interest) where the target area of interest is located as the target positioning data.

Thereafter, for each piece of positioning data in the plurality of pieces of target positioning data, the executing body may determine distribution information of a plurality of areas of interest within a preset range of the geographic location corresponding to the location information of this piece of positioning data.

Then, according to the positioning time of this piece of positioning data, historical visiting information generated by the terminal device corresponding to this piece of positioning data, types of the plurality of areas of interest (e.g., a catering type, an office type and a shopping type), etc., the executing body may predict an area of interest visited by the user of the terminal device corresponding to this piece of positioning data using a Bayesian formula, a Markov network, a neural network, or the like, and use the area of interest obtained through the prediction as a predicted area of interest. Here, if the positioning request information used when this piece of positioning data is generated is the target positioning request information, the terminal device corresponding to this piece of positioning data may be the terminal device sending the target positioning request information.

Finally, in response to determining that the predicted area of interest is the target area of interest, the executing body generates the information for the visiting point of the target area of interest using the positioning data. The generated information for the visiting point includes the visiting time, location information, and an identifier of the target area of interest. The visiting time and the location information of the visiting point are the same as the positioning time and the location information of the positioning data, respectively.

Step 202, determining, according to location information of at least one visiting point, a visiting point distribution map including the at least one visiting point.

Figures 3, 4:
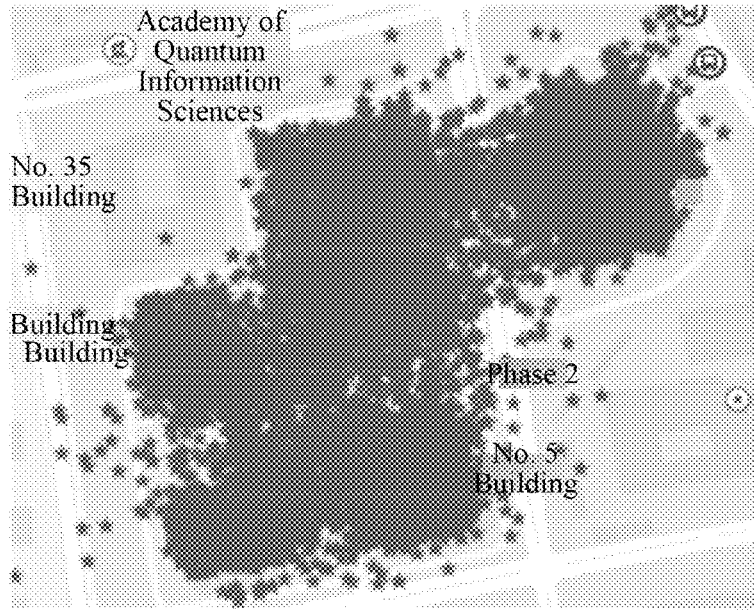
FIG. 3 is a schematic diagram of a visiting point distribution map obtained by taking a certain office building as an example.
FIG. 4 is a schematic diagram of grid division on a certain region in a map by taking the certain region in the map as an example.

In this embodiment, the executing body may determine the visiting point distribution map including the at least one visiting point according to the location information of the at least one visiting point. As an example, for each visiting point in the at least one visiting point, the executing body may mark the visiting point on an electronic map according to the location information of the visiting point. Thus, a map including a mark of the at least one visiting point is obtained, and used as the visiting point distribution map. FIG. 3 is the visiting point distribution map obtained by taking the example of the target area of interest being a certain office building, and the mark "★" in the visiting point distribution map represents the visiting point.

Step 203, performing grid division on the visiting point distribution map, to obtain a first grid map including at least one grid.

In this embodiment, the executing body may perform the grid division on the visiting point distribution map obtained in step 202, to obtain the first grid map including the at least one grid. Here, each grid in the first grid map at least includes one visiting point. In practice, the area and shape of each grid may be set according to actual needs, which is not limited here. FIG. 4 is a schematic diagram of the grid division on a certain region in a map by taking the certain region in the map as an example. The value in each grid is used to represent the coordinates of the grid. As an example, the coordinates of the grid may be obtained using the GeoHash algorithm. GeoHash is a widely used geocoding method, which can encode two-dimensional spatial latitude and longitude data into a string. It should be noted that the grid division performed on the map is a well-known technology widely studied and applied at present, which will not be repeatedly described here.

Figure 5:
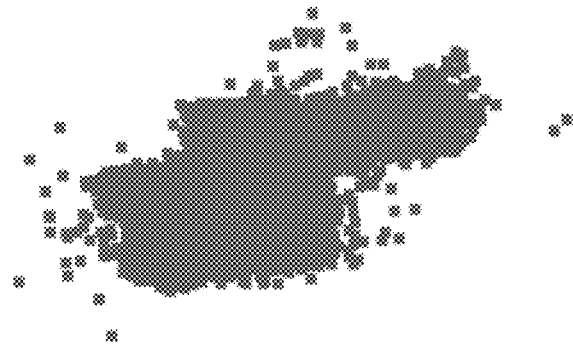
FIG. 5 is a schematic diagram of a first grid map obtained by performing the grid division on the visiting point distribution map by taking the visiting point distribution map corresponding to the office building exemplified in FIG. 3 as an example.

FIG. 5 is the first grid map obtained by performing the grid division on the visiting point distribution map, by taking the visiting point distribution map corresponding to the office building exemplified in FIG. 3 as an example. Each grid in the first grid map in FIG. 5 at least includes one visiting point.

Step 204, generating, based on the first grid map, outline information for the target area of interest.

In this embodiment, the executing body may generate the outline information for the target area of interest based on the first grid map.

In some alternative implementations of this embodiment, step 204 may be performed as follows. Step S1, a filtering processing is performed on the grids in the first grid map to obtain a second grid map. Step S2, a grid is determined, from the second grid map, as a boundary grid, and the outline information of the target area of interest is generated according to the location information of the boundary grid.

Figure 6:
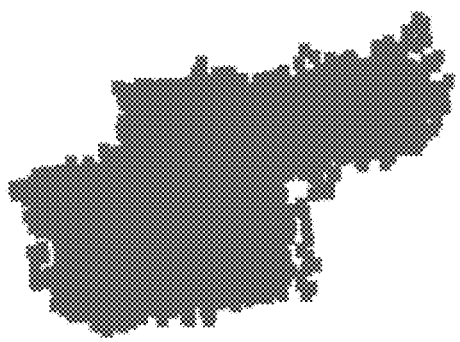
FIG. 6 is a schematic diagram of a second grid map obtained by performing a filtering processing on the first grid map in FIG. 5.
Figure 7:
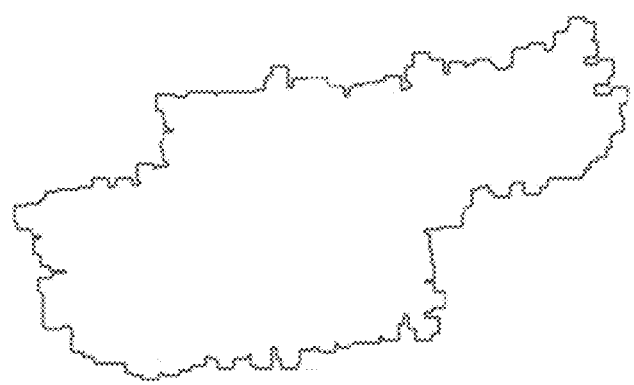
FIG. 7 is a schematic diagram of an outline obtained by taking the second grid map exemplified in FIG. 6 as an example.

In this implementation, the executing body may perform the filtering processing on the grids in the first grid map in various ways, to obtain the second grid map. FIG. 6 is the second grid map obtained by performing the filtering processing on the first grid map in FIG. 5, by taking the first grid map exemplified in FIG. 5 as an example. As an example, the executing body may perform the filtering processing on the grids in the first grid map according to the location of each grid in the first grid map. For example, the executing body may delete an isolated grid in the first grid map. For example, if a certain grid in the first grid map is not adjacent to other grids, this grid may be deleted. Thereafter, the executing body may determine, from the second grid map, a grid as the boundary grid according to a preset rule. As an example, the executing body may preset a rule for determining the boundary grid. For example, the rule may specify that a grid having a location at the outermost side of the second grid map is a boundary grid. That is, grids at both ends of each row and both ends of each column in the second grid map are boundary grids. Then, the executing body may generate the outline information of the target area of interest according to the location information of the boundary grids. As an example, the executing body may use the outline surrounded by the boundary grids as the outline of the target area of interest, and generate, according to the coordinates of each boundary grid, a coordinate sequence for describing the outline to use the coordinate sequence as the outline information. FIG. 7 is the outline obtained by taking the second grid map exemplified in FIG. 6 as an example.

In some alternative implementations, the step S1 may be performed as follows.

First, for the each grid in the first grid map, the executing body may perform the following filtering processing: determining whether the number of visiting points included in the grid is less than a preset number threshold; and deleting, in response to determining that the number of the visiting points included in the grid is less than the number threshold, the grid. Here, the number threshold may be set according to actual needs, which is not limited here.

Then, in response to determining that the filtering processing performed on the each grid in the first grid map is completed, the executing body may use the processed first grid map as the second grid map. Through this implementation, the executing body may filter out a grid including a small number of visiting points in the first grid map, thus reducing errors caused by a visiting point error.

In some alternative implementations, the second grid map may further include road location information, the road location information being used to represent the location information of a road at the geographic location corresponding to the second grid map. The step S2 may alternatively be performed as follows: determining, from the second grid map, a grid as the boundary grid, according to the road location information and the location information of the grid in the second grid map.

In this implementation, the executing body road may determine, from the second grid map, the boundary grid in consideration of the road location information and the location information of the grid. As an example, the executing body may first determine, according to the road location information, which regions represented by grids in the second grid map are roads, and use the grids representing the regions that are the roads as road grids. Then, for each row/each column in the second grid map, the executing body may ascertain whether a road grid is included in the row/column. If the road grid is included in the row/column, the road grid is used as the boundary grid. If the road grid is not included in the row/column, the grids at both ends of the each row and the each column in the second grid map are used as boundary grids. In this implementation, the road location information is comprehensively considered when determining a boundary grid, which may make the determined boundary grid more accurate.

Figure 8:
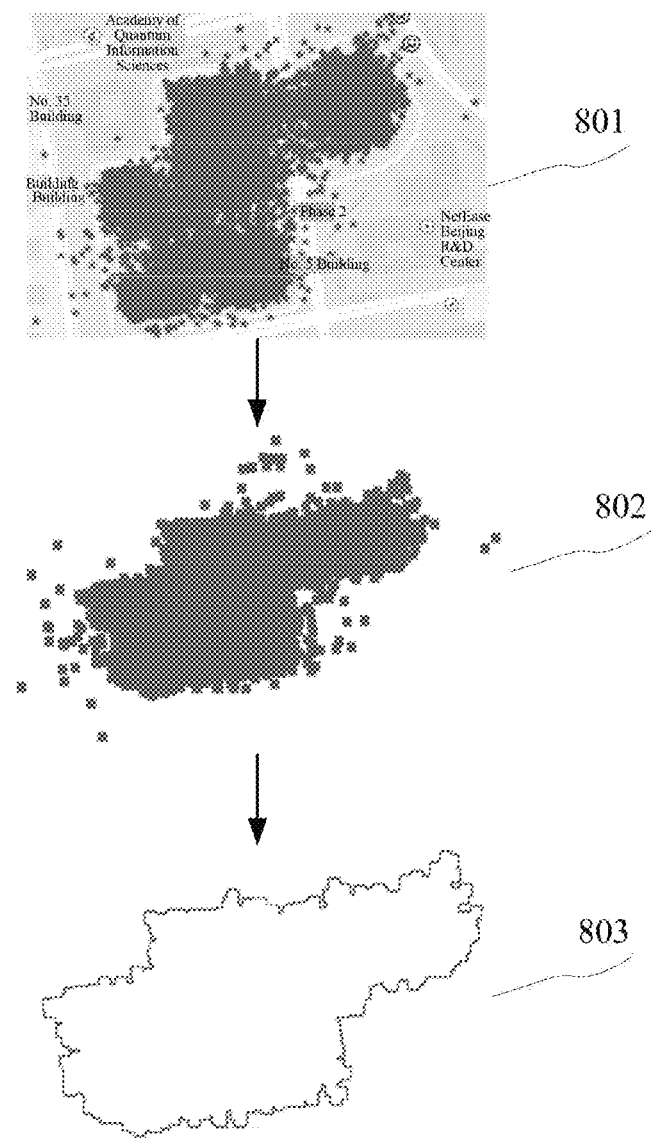
FIG. 8 is a schematic diagram of an application scenario of the method for generating information according to an embodiment of the present disclosure.

Further referring to FIG. 8, FIG. 8 is a schematic diagram of an application scenario of the method for generating information according to an embodiment. In the application scenario of FIG. 8, with the office building B as the target area of interest, the server first determines the visiting information for the office building B according to the received positioning request information, the visiting information including location information of a plurality of visiting points. Thereafter, the server determines the visiting point distribution map 801 including the plurality of visiting points according to the location information of the plurality of visiting points. Then, the server performs the grid division on the visiting point distribution map 801, to obtain the first grid map 802 including a plurality of grids. Finally, based on the first grid map 802, the server generates the outline information 803 for the target area of interest.

According to the method provided by the above embodiment of the present disclosure, the positioning request information is effectively used, and the automatic generation of the outline information of the target area of interest is implemented, thus saving generation costs of the outline information of the area of interest, and improving the generation efficiency of the outline information of the area of interest.

Figure 9:
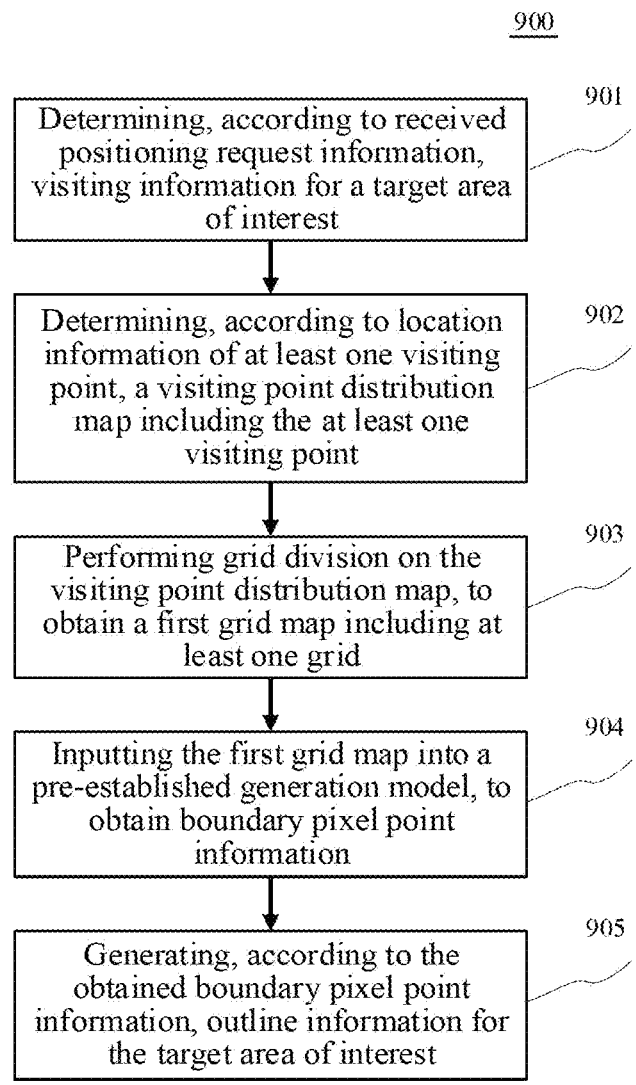
FIG. 9 is a flowchart of the method for generating information according to another embodiment of the present disclosure.

Further referring to FIG. 9, which illustrates a flow 900 of the method for generating information according to another embodiment. The flow 900 of the method for generating information includes the following steps.

Step 901, determining, according to received positioning request information, visiting information for a target area of interest.

In this embodiment, step 901 is similar to step 201 in the embodiment shown in FIG. 2, which will not be repeatedly described here.

Step 902, determining, according to location information of at least one visiting point, a visiting point distribution map including the at least one visiting point.

In this embodiment, step 902 is similar to step 202 in the embodiment shown in FIG. 2, which will not be repeatedly described here.

Step 903, performing grid division on the visiting point distribution map, to obtain a first grid map including at least one grid.

In this embodiment, step 903 is similar to step 203 in the embodiment shown in FIG. 2, which will not be repeatedly described here.

Step 904, inputting the first grid map into a pre-established generation model, to obtain boundary pixel point information.

In this embodiment, the executing body may pre-store the generation model. In this way, the executing body may input the first grid map determined in step 903 into the generation model, thereby obtaining the boundary pixel point information corresponding to the first grid map. The boundary pixel point information may be used to describe coordinates of a plurality of boundary pixel points of the first grid map in the first grid map.

Here, the generation model may be used to represent a corresponding relationship between a grid map and boundary pixel point information. As an example, the generation model may include a feature extraction portion and a corresponding relationship table. The feature extraction portion may be used to extract the feature information of the grid map. It may be understood that the feature information extraction on an image is a widely applied technology at present, which will not be repeatedly described here. The corresponding relationship table may be a corresponding relationship table established, by a technician, based on statistics on a large amount of feature information and a large amount of boundary pixel point information, and storing a plurality of corresponding relationships between the feature information and the boundary pixel point information. In this way, the generation model may first extract the feature information of the first grid map using a feature extraction unit, and use the obtained feature information as target feature information. Thereafter, the target feature information is compared with the feature information in the corresponding relationship table. If the target feature information is identical or similar to a certain piece of feature information in the corresponding relationship table, the boundary pixel point information corresponding to this piece of feature information in the corresponding relationship table is used as the boundary pixel point information of the first grid map.

In some alternative implementations of this embodiment, the generation model is trained and obtained in the following way. First, a set of training samples is acquired, a training sample including a grid map and boundary pixel point information corresponding to the grid map. Then, the grid map of the training sample in the set of training samples is used as an input, and the boundary pixel point information corresponding to the inputted grid map is used as an expected output, to train and obtain the generation model.

In this implementation, the training sample in the set of training samples may include the grid map and the boundary pixel point information corresponding to the grid map. As an example, the training sample may be obtained in the following way. First, visiting information for a sample area of interest is determined according to the received positioning request information, the visiting information including location information of a plurality of visiting points for the sample area of interest. Then, according to the location information of the plurality of visiting points for the sample area of interest, a visiting point distribution map including the plurality of visiting points is determined. Next, the grid division is performed on the visiting point distribution map, to obtain the grid map. Finally, annotation information inputted by the technician for the obtained grid map is received, and a pixel point in the grid map is annotated according to the annotation information. As an example, the technician may input the annotation information by directly drawing the outline of the sample area of interest in the grid map. In this way, the executing body may determine the type of each pixel point in the grid map according to the outline of the sample area of interest drawn by the technician. The type of the pixel point may include boundary pixel point and ordinary pixel point. For example, the pixel points corresponding to the outline of the sample area of interest drawn by the technician are annotated as boundary pixel points, and other pixel points are annotated as ordinary pixel points.

As an example, the executing body training the generation model may be the same as or different from the above executing body. As an example, the executing body training the generation model may first determine an initial model and a model parameter of the initial model. Here, the initial model may be used to represent the corresponding relationship between the grid map and the boundary pixel point information. The initial model may be various kinds of neural network models for performing semantic segmentation such as a deep convolutional neural network and a deep neural network. Then, the grid map in the training sample in the set of training samples may be inputted into the initial model, to obtain the boundary pixel point information of the grid map. The boundary pixel point information corresponding to the grid map may be used as the expected output of the initial model, to train the initial model using a machine learning method. Specifically, the difference between the obtained boundary pixel point information and the expected output may be first calculated using a preset loss function. Then, the model parameter of the initial model may be adjusted based on the calculated difference, and the training is ended if a preset training end condition is satisfied, to obtain the generation model. For example, the preset training end condition herein may include, but not limited to, at least one of: training time exceeding a preset time length, a number of times of training exceeding a preset number, a prediction accuracy of the initial model being greater than a preset accuracy threshold, or the like.

Here, the model parameter of the initial model may be adjusted based on the difference between the generated boundary pixel point information and the expected output by using various implementations. For example, the model parameter of the initial model may be adjusted using a BP (Back Propagation) algorithm or SGD (Stochastic Gradient Descent) algorithm.

Step 905, generating, according to the obtained boundary pixel point information, outline information for the target area of interest.

In this embodiment, the executing body may pre-store the corresponding relationship between geographic location information (e.g., horizontal and vertical coordinates) in the first grid map and a pixel point. In this way, according to the boundary pixel point information obtained in step 904, the executing body may determine which geographic location in the first grid map is the boundary location of a target area of interest, and generate the outline information of the target area of interest.

It may be seen from FIG. 9 that, as compared with the embodiment corresponding to FIG. 2, the flow 900 of the method for generating information in this embodiment emphasizes the step of generating the boundary pixel point information using the generation model, and the generation model is trained and obtained using a large number of training samples. Thus, the method described in this embodiment may make the outline information of the generated target area of interest more accurate.

Figure 10:
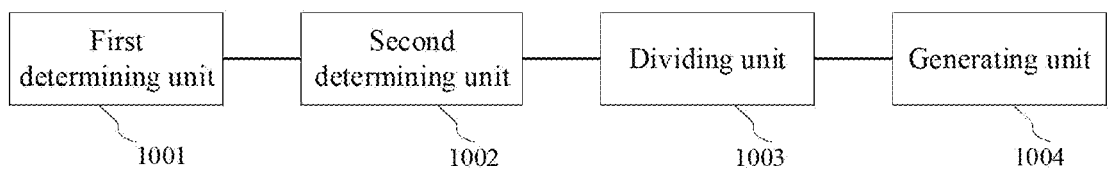
FIG. 10 is a schematic structural diagram of an apparatus for generating information according to an embodiment of the present disclosure.

Further referring to FIG. 10, as an implementation of the method shown in the above drawings, the present disclosure provides an apparatus for generating information according to an embodiment of the present disclosure. The embodiment of the apparatus corresponds to the embodiment of the method shown in FIG. 2, and the apparatus may be applied in various electronic devices.

As shown in FIG. 10, the apparatus 1000 for generating information in this embodiment includes: a first determining unit 1001, a second determining unit 1002, a dividing unit 1003 and a generating unit 1004. The first determining unit 1001 is configured to determine, according to received positioning request information, visiting information for a target area of interest, the visiting information including location information of at least one visiting point. The second determining unit 1002 is configured to determine, according to the location information of the at least one visiting point, a visiting point distribution map including the at least one visiting point. The dividing unit 1003 is configured to perform grid division on the visiting point distribution map, to obtain a first grid map including at least one grid. The generating unit 1004 is configured to generate, based on the first grid map, outline information for the target area of interest.

In this embodiment, for specific processing of the first determining unit 1001, the second determining unit 1002, the dividing unit 1003 and the generating unit 1004 in the apparatus 1000 for generating information, and their technical effects, reference may be made to step 201, step 202, step 203 and step 204 in the corresponding embodiment of FIG. 2 respectively, which will not be repeatedly described here.

In some alternative implementations of this embodiment, the generating unit 1004 includes: a filtering unit (not shown in the figure), configured to perform a filtering processing on the at least one grid in the first grid map to obtain a second grid map; and a generating subunit (not shown in the figure), configured to determine, from the second grid map, a grid as a boundary grid, and generate, according to location information of the boundary grid, the outline information for the target area of interest.

In some alternative implementations of this embodiment, the second grid map includes road location information. The generating subunit is further configured to: determine, from the second grid map, the grid as the boundary grid, according to the road location information and location information of the grid in the second grid map.

In some alternative implementations of this embodiment, the filtering unit is further configured to: perform, for each of the at least one grid in the first grid map, the following filtering processing: determining whether a number of visiting points included in the grid is less than a preset number threshold, and deleting the grid in response to determining the number of the visiting points included in the grid being less than the number threshold; and use, in response to determining a completion of the filtering processing performed on the each grid in the first grid map, the processed first grid map as the second grid map.

In some alternative implementations of this embodiment, the generating unit 1004 is further configured to: input the first grid map into a pre-established generation model, to obtain boundary pixel point information, the generation model being used to represent a corresponding relationship between a grid map and boundary pixel point information; and generate, according to the obtained boundary pixel point information, the outline information for the target area of interest.

In some alternative implementations of this embodiment, the generation model is trained and obtained by: acquiring a set of training samples, a training sample including the grid map and the boundary pixel point information corresponding to the grid map; and using the grid map of the training sample in the set of training samples as an input, and using the boundary pixel point information corresponding to the inputted grid map as an expected output, to train and obtain the generation model.

Figure 11:
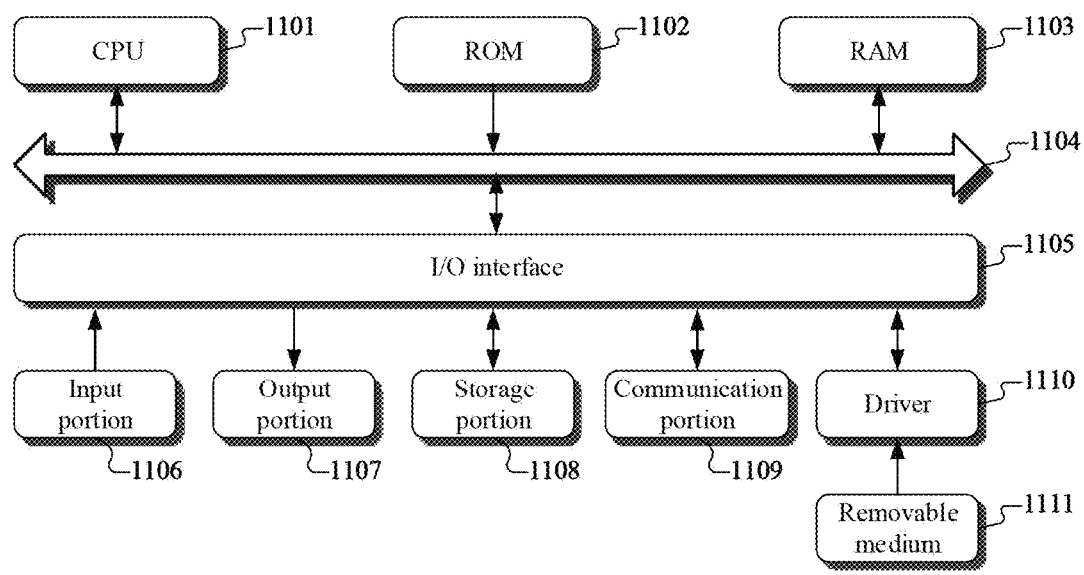
FIG. 11 is a schematic structural diagram of a computer system adapted to implement a server according to embodiments of the present disclosure.

Referring to FIG. 11, FIG. 11 is a schematic structural diagram of a computer system 1100 adapted to implement a server of the embodiments of the present disclosure. The server shown in FIG. 11 is merely an example, and should not bring any limitations to the functions and the scope of use of the embodiments of the present disclosure.

As shown in FIG. 11, the computer system 1100 includes a central processing unit (CPU) 1101, which may execute various appropriate actions and processes in accordance with a program stored in a read-only memory (ROM) 1102 or a program loaded into a random access memory (RAM) 1103 from a storage portion 1108. The RAM 1103 also stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: an input portion 1106 including a keyboard, a mouse, etc.; an output portion 1107 including a cathode ray tube (CRT), a liquid crystal display device (LCD), a speaker, etc.; a storage portion 1108 including a hard disk and the like; and a communication portion 1109 including a network interface card such as a LAN (local area network) card and a modem. The communication portion 1109 performs communication processes via a network such as the Internet. A driver 1110 is also connected to the I/O interface 1105 as required. A removable medium 1111 such as a magnetic disk, an optical disk, a magneto-optical disk, and a semiconductor memory may be installed on the driver 1110, to facilitate the retrieval of a computer program from the removable medium 1111, and the installation thereof on the storage portion 1108 as needed.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 1109, and/or may be installed from the removable medium 1111. The computer program, when executed by the central processing unit (CPU) 1101, implements the above mentioned functionalities defined in the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functionalities and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functionalities. It should also be noted that, in some alternative implementations, the functionalities denoted by the blocks may occur in a sequence different from the sequences shown in the figures. For example, any two blocks presented in succession may be executed substantially in parallel, or they may sometimes be executed in a reverse sequence, depending on the functionality involved. It should also be noted that each block in the block diagrams and/or flowcharts as well as a combination of blocks may be implemented using a dedicated hardware-based system executing specified functionalities or operations, or by a combination of dedicated hardware and computer instructions.

The units involved in the embodiments of the present disclosure may be implemented by means of software or hardware. The described units may also be provided in a processor. For example, the processor may be described as: a processor comprising a first determining unit, a second determining unit, a dividing unit and a generating unit. The names of these units do not in some cases constitute a limitation to such units themselves. For example, the first determining unit may alternatively be described as "a unit for determining, according to received positioning request information, visiting information for a target area of interest."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: determine, according to received positioning request information, visiting information for a target area of interest, the visiting information including location information of at least one visiting point; determine, according to the location information of the at least one visiting point, a visiting point distribution map including the at least one visiting point; perform grid division on the visiting point distribution map, to obtain a first grid map including at least one grid; and generate, based on the first grid map, outline information for the target area of interest.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functionalities.

What is claimed is:

1. A method for generating information, comprising performing, by a server computer:

receiving, over a wide area network from terminal devices, positioning request information related to one or more network access points to which the terminal devices connect, the positioning request information comprising signal strengths of the one or more network access points;

determining, according to the received positioning request information, visiting information for a target area of interest that includes the one or more network access points, the visiting information comprising location information of at least one visiting point;

determining, according to the location information of the at least one visiting point, a visiting point distribution map comprising the at least one visiting point;

performing grid division on the visiting point distribution map, to obtain a first grid map comprising at least one grid, wherein each grid of the at least one grid of the first grid map includes the at least one visiting point; and generating, based on the first grid map, outline information for the target area of interest, wherein generating, based on the first grid map, the outline information for the target area of interest comprises:

removing each first grid from the at least one grid of the first grid map, wherein the each first grid is an isolated grid which is not adjacent to any one of second grids of the at least one grid, each of the second grids is adjacent to another second grid, and a number of the second grids is greater than a number of the first grids; and a distance between the each first grid and any one of the second grids is greater than a distance between any two grids of the second grids;

determining the second grids as a second grid map;

determining, from the second grid map, a grid as a boundary grid, and generating, according to location information of the boundary grid, the outline information for the target area of interest;

inputting the first grid map into a pre-established generation model, to obtain boundary pixel point information, the pre-established generation model being used to represent a corresponding relationship between a grid map and the boundary pixel point information; and generating, further according to the boundary pixel point information, the outline information for the target area of interest.

2. The method according to claim 1, wherein the second grid map comprises road location information, and determining, from the second grid map, the grid as the boundary grid comprises:

determining, from the second grid map, the grid as the boundary grid, according to the road location information and the location information of the boundary grid.

3. The method according to claim 1, wherein generating, based on the first grid map, the outline information for the target area of interest further comprises:

for the each grid of the at least one grid of the first grid map, determining whether a number of visiting points included in the grid is smaller than a preset number threshold; and in response to determining the number of the visiting points included in the grid is smaller than the preset number threshold, removing the grid.

4. The method according to claim 1, wherein the pre-established generation model is trained and obtained by:

acquiring a set of training samples, a training sample comprising the grid map and the boundary pixel point information corresponding to the grid map; and using the grid map of the training sample in the set of training samples as an input, and using the boundary pixel point information corresponding to the inputted grid map as an expected output, to train and obtain the pre-established generation model.

5. The method of claim 1, wherein the positioning request information further includes at least one of: information relating to a local network that is scanned by the terminal devices, and information relating to a local network with which the terminal devices are connected.

6. The method of claim 1, wherein determining, according to the received positioning request information, the visiting information for the target area of interest comprises:

generating a plurality of first pieces of positioning data according to the received positioning request information sent by the terminal devices;

selecting a plurality of second pieces of positioning data in a predetermined geographic area from the plurality of first pieces of positioning data as target pieces of positioning data, wherein the predetermined geographic area comprises the target area of interest;

for each target piece of positioning data, predicting an area of interest visited by a user of a target terminal device corresponding to the target piece of positioning data; and in response to determining that the predicted area of interest is the target area of interest, using the target piece of positioning data to generate the visiting information for the target area of interest, wherein the target terminal device corresponding to the target piece of positioning data is a terminal device sending the target piece of positioning data in the terminal devices.

7. An apparatus for generating information, comprising:

at least one processor; and a memory storing instructions, wherein the instructions when executed by the at least one processor, cause the at least one processor to perform operations, the operations comprising:

receiving, over a wide area network from terminal devices, positioning request information related to one or more network access points to which the terminal devices connect, the positioning request information comprising signal strengths of the one or more network access points;

determining, according to the received positioning request information, visiting information for a target area of interest that includes the one or more network access points, the visiting information comprising location information of at least one visiting point;

determining, according to the location information of the at least one visiting point, a visiting point distribution map comprising the at least one visiting point;

performing grid division on the visiting point distribution map, to obtain a first grid map comprising at least one grid, wherein each grid of the at least one grid of the first grid map includes the at least one visiting point; and generating, based on the first grid map, outline information for the target area of interest, wherein generating, based on the first grid map, the outline information for the target area of interest comprises:

removing each first grid from the at least one grid of the first grid map, wherein the each first grid is an isolated grid which is not adjacent to any one of second grids of the at least one grid, each of the second grids is adjacent to another second grid, and a number of the second grids is greater than a number of the first grids; and a distance between the each first grid and any one of the second grids is greater than a distance between any two grids of the second grids;

determining the second grids as a second grid map;

determining, from the second grid map, a grid as a boundary grid, and generating, according to location information of the boundary grid, the outline information for the target area of interest;

inputting the first grid map into a pre-established generation model, to obtain boundary pixel point information, the pre-established generation model being used to represent a corresponding relationship between a grid map and the boundary pixel point information; and generating, further according to the boundary pixel point information, the outline information for the target area of interest.

8. The apparatus according to claim 7, wherein the second grid map comprises road location information, and determining, from the second grid map, the grid as the boundary grid comprises:

determining, from the second grid map, the grid as the boundary grid, according to the road location information and the location information of the boundary grid.

9. The apparatus according to claim 7, wherein generating, based on the first grid map, the outline information for the target area of interest further comprises:

for the each grid of the at least one grid of the first grid map, determining whether a number of visiting points included in the grid is smaller than a preset number threshold; and in response to determining the number of the visiting points included in the grid is smaller than the preset number threshold, removing the grid.

10. The apparatus according to claim 7, wherein the pre-established generation model is trained and obtained by:

acquiring a set of training samples, a training sample comprising the grid map and the boundary pixel point information corresponding to the grid map; and using the grid map of the training sample in the set of training samples as an input, and using the boundary pixel point information corresponding to the inputted grid map as an expected output, to train and obtain the pre-established generation model.

11. A non-transitory computer readable medium, storing a computer program, wherein the computer program, when executed by a processor, causes the processor to perform operations, the operations comprising:

receiving, over a wide area network from terminal devices, positioning request information related to one or more network access points to which the terminal devices connect, the positioning request information comprising signal strengths of the one or more network access points;

determining, according to the received positioning request information, visiting information for a target area of interest that includes the one or more network access points, the visiting information comprising location information of at least one visiting point;

determining, according to the location information of the at least one visiting point, a visiting point distribution map comprising the at least one visiting point;

performing grid division on the visiting point distribution map, to obtain a first grid map comprising at least one grid, wherein each grid of the at least one grid of the first grid map includes the at least one visiting point; and generating, based on the first grid map, outline information for the target area of interest, wherein generating, based on the first grid map, the outline information for the target area of interest comprises:

removing each first grid from the at least one grid of the first grid map, wherein the each first grid is an isolated grid which is not adjacent to any one of second grids of the at least one grid, each of the second grids is adjacent to another second grid, and a number of the second grids is greater than a number of the first grids; and a distance between the each first grid and any one of the second grids is greater than a distance between any two grids of the second grids;

determining the second grids as a second grid map;

determining, from the second grid map, a grid as a boundary grid, and generating, according to location information of the boundary grid, the outline information for the target area of interest;

inputting the first grid map into a pre-established generation model, to obtain boundary pixel point information, the pre-established generation model being used to represent a corresponding relationship between a grid map and the boundary pixel point information; and generating, further according to the boundary pixel point information, the outline information for the target area of interest.

12. The non-transitory computer readable medium according to claim 11, wherein the second grid map comprises road location information, and determining, from the second grid map, the grid as the boundary grid comprises:

determining, from the second grid map, the grid as the boundary grid, according to the road location information and the location information of the boundary grid.

13. The non-transitory computer readable medium according to claim 11, wherein generating, based on the first grid map, the outline information for the target area of interest further comprises:

for the each grid of the at least one grid of the first grid map, determining whether a number of visiting points included in the grid is smaller than a preset number threshold; and in response to determining the number of the visiting points included in the grid is smaller than the preset number threshold, removing the grid.

14. The non-transitory computer readable medium according to claim 11, wherein the pre-established generation model is trained and obtained by:

acquiring a set of training samples, a training sample comprising the grid map and the boundary pixel point information corresponding to the grid map; and using the grid map of the training sample in the set of training samples as an input, and using the boundary pixel point information corresponding to the inputted grid map as an expected output, to train and obtain the pre-established generation model.

* * * * *